(12) United States Patent
Ishida et al.

(10) Patent No.: US 11,319,255 B2
(45) Date of Patent: May 3, 2022

(54) COMPOSITE SINTERED MATERIAL AND TOOL USING SAME

(71) Applicant: SUMITOMO ELECTRIC HARDMETAL CORP., Hyogo (JP)

(72) Inventors: Yuh Ishida, Hyogo (JP); Satoru Kukino, Hyogo (JP); Michiko Matsukawa, Hyogo (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 0 days.

(21) Appl. No.: 17/280,939

(22) PCT Filed: Mar. 18, 2020

(86) PCT No.: PCT/JP2020/012007
§ 371 (c)(1),
(2) Date: Mar. 29, 2021

(87) PCT Pub. No.: WO2021/186617
PCT Pub. Date: Sep. 23, 2021

(65) Prior Publication Data
US 2021/0309579 A1    Oct. 7, 2021

(51) Int. Cl.
*C04B 35/5831*    (2006.01)
*B23B 27/14*    (2006.01)

(52) U.S. Cl.
CPC .......... *C04B 35/5831* (2013.01); *B23B 27/14* (2013.01); *C04B 2235/386* (2013.01);
(Continued)

(58) Field of Classification Search
CPC .... B23B 27/14; C04B 35/583; C04B 35/5831
See application file for complete search history.

(56) References Cited

U.S. PATENT DOCUMENTS

| 5,618,509 A | 4/1997 | Shioi |
| 2020/0247673 A1 | 8/2020 | Hirano |

FOREIGN PATENT DOCUMENTS

| JP | 7-068153 A | 3/1995 |
| JP | H11-246271 A | 9/1999 |

(Continued)

OTHER PUBLICATIONS

Frane. Consolidation of cubic and hexagonal boron nitride composites. Diamond & Related Materials 62 (2016) 30-41 (Year: 2016).*

(Continued)

*Primary Examiner* — Matthew E. Hoban
(74) *Attorney, Agent, or Firm* — Rennet, Otto, Boisselle & Sklar, LLP

(57) ABSTRACT

A composite sintered material includes: cubic boron nitride grains; and hexagonal boron nitride grains or the hexagonal boron nitride grains and wurtzite type boron nitride grains, wherein a dislocation density of the cubic boron nitride grains is more than or equal to $1\times10^{15}/m^2$ and less than or equal to $1\times10^{17}/m^2$, a median diameter d50 of equivalent circle diameters of the cubic boron nitride grains is more than or equal to 10 nm and less than or equal to 500 nm, and a relationship of the following expression 1 is satisfied:

$0.015 \leq (Vh+Vw)/(Vc+Vh+Vw) \leq 0.5$,    Expression 1:

where Vc represents a volume-based content ratio of the cubic boron nitride grains, Vh represents a volume-based content ratio of the hexagonal boron nitride grains, and Vw represents a volume-based content ratio of the wurtzite type boron nitride grains.

10 Claims, 2 Drawing Sheets

(52) U.S. Cl.
CPC .. *C04B 2235/762* (2013.01); *C04B 2235/767* (2013.01); *C04B 2235/781* (2013.01); *C04B 2235/785* (2013.01)

(56) References Cited

FOREIGN PATENT DOCUMENTS

| JP | 2003-192443 A | 7/2003 |
| JP | 2004-250278 A | 9/2004 |
| JP | 2014-034487 A | 2/2014 |
| WO | 2019/244894 A1 | 12/2019 |
| WO | 2020/050229 A1 | 3/2020 |

OTHER PUBLICATIONS

Ying. High-Pressure Synthesis of cBN Nanoparticles with High-Density Nanotwin Substructures. ACS Omega 2020, 5, 650-654 (Year: 2019).*

T. Ungar and A. Borbely, "The effect of dislocation contrast on x-ray line broadening: A new approach to line profile analysis," Appl. Phys. Lett., vol. 69, No. 21, p. 3173, 1996.

T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, No. 10, pp. 3693-3699, 1998.

* cited by examiner

COMPOSITE SINTERED MATERIAL AND TOOL USING SAME

TECHNICAL FIELD

The present disclosure relates to a composite sintered material and a tool using the same.

BACKGROUND ART

Cubic boron nitride (hereinafter, also referred to as "cBN") has hardness second to diamond and is also excellent in thermal stability and chemical stability. Therefore, a cubic boron nitride sintered material has been used as a tool material.

As such a cubic boron nitride sintered material, a cubic boron nitride sintered material including about 10 to 40 volume % of a binder has been used. However, the binder causes decreased strength and thermal diffusivity of the sintered material.

In order to solve this problem, a method has been developed to obtain a cubic boron nitride sintered material including no binder by directly converting hexagonal boron nitride into cubic boron nitride under ultrahigh pressure and high temperature and sintering it at the same time without using a binder (Japanese Patent Laying-Open No. 2004-250278 (PTL 1), Japanese Patent Laying-Open No. 11-246271 (PTL 2) and Japanese Patent Laying-Open No. 2014-34487 (PTL 3)).

CITATION LIST

Patent Literature

PTL 1: Japanese Patent Laying-Open No. 2004-250278
PTL 2: Japanese Patent Laying-Open No. 11-246271
PTL 3: Japanese Patent Laying-Open No. 2014-34487

SUMMARY OF INVENTION

A composite sintered material of the present disclosure includes:
cubic boron nitride grains; and
hexagonal boron nitride grains or the hexagonal boron nitride grains and wurtzite type boron nitride grains, wherein
a dislocation density of the cubic boron nitride grains is more than or equal to $1\times10^{15}/m^2$ and less than or equal to $1\times10^{17}/m^2$,
a median diameter d50 of equivalent circle diameters of the cubic boron nitride grains is more than or equal to 10 nm and less than or equal to 500 nm, and
a relationship of the following expression 1 is satisfied:

$$0.015 \leq (Vh+Vw)/(Vc+Vh+Vw) \leq 0.5, \quad \text{Expression 1:}$$

where Vc represents a volume-based content ratio of the cubic boron nitride grains, Vh represents a volume-based content ratio of the hexagonal boron nitride grains, and Vw represents a volume-based content ratio of the wurtzite type boron nitride grains.

A tool of the present disclosure is a tool using the above-described composite sintered material.

DETAILED DESCRIPTION

Figure 1:
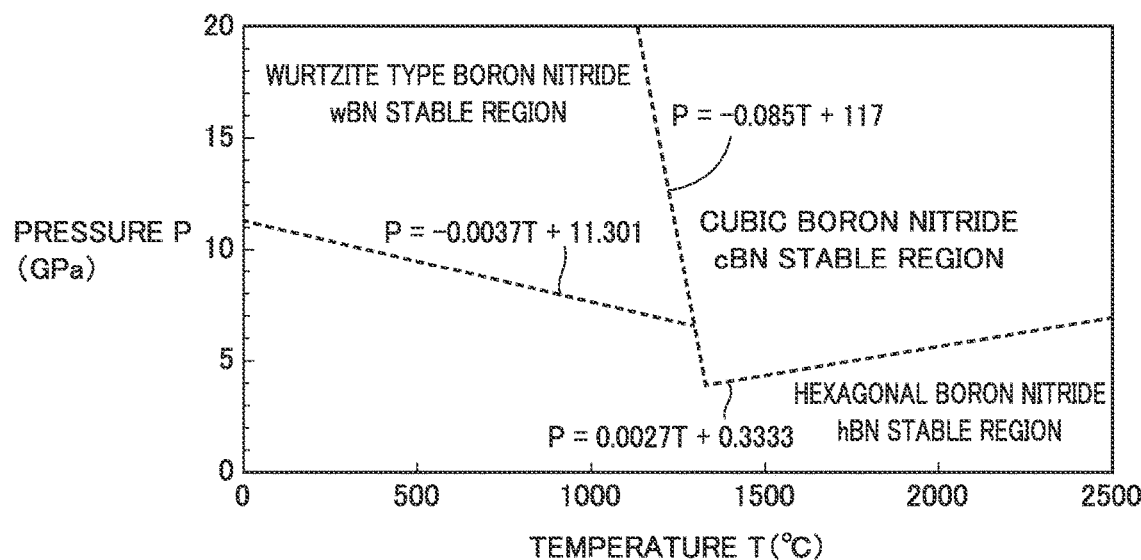
FIG. 1 is a pressure-temperature phase diagram of boron nitride.

Problem to be Solved by the Present Disclosure

When a die is produced using a cubic boron nitride sintered material, the die is likely to be adhered to a wire material due to friction during wire drawing. Hence, breakage of wire may occur during wire drawing, or a scratch may be generated on a surface of the obtained wire material.

In view of the above, the present object is to provide a composite sintered material that can attain a long tool life without deteriorating a surface condition of a wire material particularly in a wire drawing process when used as a tool material.

Advantageous Effect of the Present Disclosure

According to the present disclosure, there can be provided a composite sintered material that can attain a long tool life without deteriorating a surface condition of a wire material particularly in a wire drawing process when used as a tool material.

Description of Embodiments

First, embodiments of the present disclosure are listed and described.

(1) A composite sintered material of the present disclosure includes:
cubic boron nitride grains; and
hexagonal boron nitride grains or the hexagonal boron nitride grains and wurtzite type boron nitride grains, wherein
a dislocation density of the cubic boron nitride grains is more than or equal to $1\times10^{15}/m^2$ and less than or equal to $1\times10^{17}/m^2$,
a median diameter d50 of equivalent circle diameters of the cubic boron nitride grains is more than or equal to 10 nm and less than or equal to 500 nm, and
a relationship of the following expression 1 is satisfied:

$$0.015 \leq (Vh+Vw)/(Vc+Vh+Vw) \leq 0.5, \quad \text{Expression 1:}$$

where Vc represents a volume-based content ratio of the cubic boron nitride grains, Vh represents a volume-based content ratio of the hexagonal boron nitride grains, and Vw represents a volume-based content ratio of the wurtzite type boron nitride grains.

When the composite sintered material of the present disclosure is used as a tool material, the composite sintered material can attain a long tool life without deteriorating a surface condition of a wire material particularly in a wire drawing process.

(2) The dislocation density of the cubic boron nitride grains is preferably more than or equal to $1\times10^{15}/m^2$ and less than or equal to $3\times10^{16}/m^2$. With this, the tool is less likely to be adhered to a wire, thereby attaining a further improved tool life.

(3) The dislocation density of the cubic boron nitride grains is preferably more than or equal to $1 \times 10^{15}/m^2$ and less than or equal to $5 \times 10^{15}/m^2$. With this, the tool is less likely to be adhered to a wire, thereby attaining a further improved tool life.

(4) The median diameter d50 of the equivalent circle diameters of the cubic boron nitride grains is preferably more than or equal to 10 nm and less than or equal to 300 nm. Thus, a scratch is less likely to be generated on a surface of a wire material to suppress a deteriorated surface condition of the wire material, thereby attaining a further improved tool life.

(5) The median diameter d50 of the equivalent circle diameters of the cubic boron nitride grains is preferably more than or equal to 10 nm and less than or equal to 100 nm. Thus, a scratch is less likely to be generated on a surface of a wire material to suppress a deteriorated surface condition of the wire material, thereby attaining a further improved tool life.

(6) Preferably, a relationship of the following expression 2 is satisfied:

$$0.03 \leq (Vh+Vw)/(Vc+Vh+Vw) \leq 0.4, \qquad \text{Expression 2:}$$

where Vc represents the volume-based content ratio of the cubic boron nitride grains, Vh represents the volume-based content ratio of the hexagonal boron nitride grains, and Vw represents the volume-based content ratio of the wurtzite type boron nitride grains.

With this, slidability between the tool and the wire material is improved to suppress a deteriorated surface condition of the wire material, thereby attaining a further improved tool life.

(7) A total content of an alkali metal element and an alkaline earth metal element in the composite sintered material is preferably less than or equal to 10 ppm on a mass basis. A tool using the composite sintered material can have an excellent tool life.

(8) The dislocation density is preferably calculated using a modified Williamson-Hall method and a modified Warren-Averbach method. The dislocation density is well correlated with performance of the composite sintered material.

(9) The dislocation density is preferably measured using synchrotron radiation as an X-ray source. The dislocation density is well correlated with performance of the composite sintered material.

(10) A tool of the present disclosure is a tool using the above-described composite sintered material. The tool of the present disclosure can have a long tool life without deteriorating a surface condition of a wire material particularly in a wire drawing process.

Details of Embodiments of the Present Disclosure

Specific examples of a composite sintered material and a tool using the composite sintered material according to one embodiment of the present disclosure will be described.

In the present specification, the expression "A to B" represents a range of lower to upper limits (i.e., more than or equal to A and less than or equal to B). When no unit is indicated for A and a unit is indicated only for B, the unit of A is the same as the unit of B.

First Embodiment: Composite Sintered Material

A composite sintered material according to one embodiment of the present disclosure includes: cubic boron nitride grains; and hexagonal boron nitride grains or the hexagonal boron nitride grains and wurtzite type boron nitride grains, wherein a dislocation density of the cubic boron nitride grains is more than or equal to $1 \times 10^{15}/m^2$ and less than or equal to $1 \times 10^{17}/m^2$, a median diameter d50 of equivalent circle diameters of the cubic boron nitride grains is more than or equal to 10 nm and less than or equal to 500 nm, and a relationship of the following expression 1 is satisfied:

$$0.015 \leq (Vh+Vw)/(Vc+Vh+Vw) \leq 0.5, \qquad \text{Expression 1:}$$

where Vc represents a volume-based content ratio of the cubic boron nitride grains, Vh represents a volume-based content ratio of the hexagonal boron nitride grains, and Vw represents a volume-based content ratio of the wurtzite type boron nitride grains.

When the composite sintered material of the present disclosure is used as a tool material, the composite sintered material can attain a long tool life without deteriorating a surface condition of a wire material particularly in a wire drawing process. Reasons for this are not unknown but are presumed as follows in (i) to (iv).

(i) The composite sintered material of the present disclosure includes cubic boron nitride grains and hexagonal boron nitride grains or the hexagonal boron nitride grains and wurtzite type boron nitride grains, and includes substantially no binder, sintering aid, catalyst, or the like. This leads to improved strength and thermal diffusivity of the composite sintered material. Therefore, a tool using such a composite sintered material is less likely to be adhered due to generation of frictional heat even in a wire drawing process, and can have a long tool life.

(ii) In the composite sintered material of the present disclosure, the dislocation density of the cubic boron nitride grains is more than or equal to $1 \times 10^{15}/m^2$ and less than or equal to $1 \times 10^{17} n/m^2$. Each of the cubic boron nitride grains has high hardness, excellent toughness, high crystallinity, and high thermal diffusivity. Therefore, a tool using the composite sintered material including such cubic boron nitride grains has excellent wear resistance even in a wire drawing process, is less likely to be adhered due to generation of frictional heat, and can have a long tool life.

(iii) In the composite sintered material of the present disclosure, the median diameter d50 of the equivalent circle diameters of the cubic boron nitride grains is more than or equal to 10 nm and less than or equal to 500 nm. The composite sintered material including such cubic boron nitride grains has excellent strength, improved toughness, and excellent crack propagation resistance. Therefore, a crack is less likely to be generated in a tool using the composite sintered material even in a wire drawing process, and the tool can have a long tool life.

(iv) In the composite sintered material of the present disclosure, the relationship of the following expression 1 is satisfied:

$$0.015 \leq (Vh+Vw)/(Vc+Vh+Vw) \leq 0.5, \qquad \text{Expression 1:}$$

where Vc represents a volume-based content ratio of the cubic boron nitride grains, Vh represents a volume-based content ratio of the hexagonal boron nitride grains, and Vw represents a volume-based content ratio of the wurtzite type boron nitride grains.

That is, in the composite sintered material of the present disclosure, a ratio of the total of the hexagonal boron nitride grains and the wurtzite type boron nitride grains to the total of the cubic boron nitride grains, the hexagonal boron nitride grains and the wurtzite type boron nitride grains is more than or equal to 1.5 volume % and less than or equal to 50 volume %. Each of the hexagonal boron nitride and the wurtzite type boron nitride has low frictional resistance during wire drawing, and can provide slidability to the composite sintered material. Therefore, the composite sintered material with the above-described ratio of the hexagonal boron nitride grains and the wurtzite type boron nitride grains has excellent slidability, and is less likely to be adhered to a wire or break the wire due to generation of frictional heat even in a wire drawing process, and can attain a long tool life.

Further, the hexagonal boron nitride and the wurtzite type boron nitride are softer than the cubic boron nitride, and therefore can have excellent crack propagation resistance. Therefore, a crack is less likely to be generated in a tool using the composite sintered material even in a wire drawing process, and the tool can have a long tool life.

Further, in the composite sintered material of the present disclosure, the ratio of the cubic boron nitride grains to the total of the cubic boron nitride grains, the hexagonal boron nitride grains, and the wurtzite type boron nitride grains is more than or equal to 50 volume % and less than or equal to 98.5 volume %. As described above in (ii), each of the cubic boron nitride grains has high hardness, excellent toughness, high crystallinity, and high thermal diffusivity. Therefore, a tool using the composite sintered material with the above-described ratio of the cubic boron nitride grains has excellent wear resistance even in a wire drawing process, is less likely to be adhered due to generation of frictional heat, and can have a long tool life.

In the above description, it has been described that the composite sintered material of the present disclosure has a long tool life in a wire drawing process, but the processing method is not limited to this. Examples of the processing method include a process employing a cutting tool, By improving lubricity, the cutting tool can be reduced in terms of adhesion to a workpiece and cutting resistance can be made low.

<Composition>

The composite sintered material of the present disclosure includes: the cubic boron nitride (hereinafter, also referred to as "cBN") grains; the hexagonal boron nitride (hereinafter, also referred to as "hBN") grains, or the hexagonal boron nitride grains and the wurtzite type boron nitride (hereinafter, also referred to as "wBN") grains. That is, the composite sintered material of the present disclosure can be in the following form (a) or (b).

(a) The composite sintered material of the present disclosure consists of the cubic boron nitride grains and the hexagonal boron nitride grains.

(b) The composite sintered material of the present disclosure consists of the cubic boron nitride grains, the hexagonal boron nitride grains, and the wurtzite type boron nitride grains.

It should be noted that in the present specification, the hexagonal boron nitride included in the composite sintered material of the present disclosure is defined as including normal "hexagonal boron nitride" and/or "compressed hexagonal boron nitride". The compressed hexagonal boron nitride has refers to a hexagonal boron nitride which has a crystal structure similar to that of the normal hexagonal boron nitride and in which a plane interval in a c axis direction is smaller than the plane interval (0.333 nm) of the normal hexagonal boron nitride. The compressed hexagonal boron nitride has lubricity as with the normal hexagonal boron nitride. Therefore, in the present specification, the normal hexagonal boron nitride and the compressed hexagonal boron nitride are regarded as the same. The hexagonal boron nitride included in the composite sintered material of the present disclosure is defined as including the "hexagonal boron nitride" and/or the "compressed hexagonal boron nitride".

The composite sintered material may include an inevitable impurity as long as the effect of the present disclosure is exhibited. Examples of the inevitable impurity include hydrogen, oxygen, carbon, and metal elements such as an alkali metal element (lithium (Li), sodium (Na), potassium (K) or the like) and an alkali earth metal element (calcium (Ca), magnesium (Mg), strontium (Sr), barium (Ba) or the like). When the composite sintered material includes such an inevitable impurity, the content of the inevitable impurity is preferably less than or equal to 0.5 volume %. The content of the inevitable impurity can be measured by secondary ion mass spectrometry (SIMS).

The total content of the alkali metal element (lithium (Li), sodium (Na), or potassium (K)) and the alkaline earth metal element (calcium (Ca), magnesium (Mg), strontium (Sr), or barium (Ba)) in the composite sintered material is preferably less than or equal to 10 ppm on a mass basis. The total content is measured by secondary ion mass spectrometry (SIMS).

Among the above-described inevitable impurities, each of the alkali metal element and the alkaline earth metal element has a catalytic action for phase conversion between hexagonal boron nitride and cubic boron nitride. In the case where the total content of the alkali metal element and the alkaline earth metal element in the composite sintered material is less than or equal to 10 ppm, even when an interface between a tool using the composite sintered material and a workpiece is subjected to a high temperature and a high pressure in a processing environment, damage of the tool can be excellently suppressed from being progressed due to part of the cubic boron nitride in the tool being converted into hexagonal boron nitride. The lower limit of the total content of the alkali metal element and the alkaline earth metal element in the composite sintered material is preferably 0 ppm. That is, the total content of the alkali metal element and the alkaline earth metal element in the composite sintered material is preferably more than or equal to 0 ppm and less than or equal to 10 ppm.

A conventional cubic boron nitride sintered material is produced using cBN abrasive grains as a starting material as described in, for example, Japanese Patent Laying-Open No. 2006-201216. Here, the total content of the catalyst components (the alkali metal element and the alkaline earth metal element) remaining in each of the cBN abrasive grains (the content of the catalyst components in 1 mol of cBN) is $2.4 \times 10^{-4}$ to $13 \times 10^{-4}$ mol. Therefore, it is obvious for one having ordinary skill in the art that the total content of the catalyst components in the conventional cubic boron nitride sintered material obtained by sintering the cBN abrasive grains is more than or equal to 0.01 mass % (100 ppm).

On the other hand, as described below, the composite sintered material of the present disclosure is obtained by using hexagonal boron nitride or pyrolytic boron nitride as a starting material and applying heat and pressure onto the hexagonal boron nitride or pyrolytic boron nitride to convert the hexagonal boron nitride or pyrolytic boron nitride into cubic boron nitride without using a catalyst. Therefore, the content of the catalyst components in the composite sintered material can be less than or equal to 10 ppm on a mass basis.

The total content of silicon (Si) and aluminum (Al) in the composite sintered material is preferably less than or equal to 50 ppm on a mass basis. The total content is measured by secondary ion mass spectrometry (SLIMS). With this, even when an interface between a tool using the composite sintered material and a workpiece is subjected to a high temperature and a high pressure in a processing environment, damage of the tool can be excellently suppressed from being progressed due to part of the cubic boron nitride in the tool being reacted with Si or Al.

The composite sintered material includes substantially no binder, sintering aid, catalyst, or the like. This leads to improved strength and thermal diffusivity of the composite sintered material.

The lower limit of the content ratio of the cubic boron nitride grains in the composite sintered material is preferably more than or equal to 50 volume %, is more preferably more than or equal to 60 volume %, and is further preferably more than or equal to 70 volume %. The upper limit of the content ratio of the cubic boron nitride grains in the composite sintered material is preferably less than or equal to 98.5 volume %, is more preferably less than or equal to 97 volume %, and is further preferably less than or equal to 95 volume %. The content ratio of the cubic boron nitride grains in the composite sintered material is preferably more than or equal to 50 volume % and less than or equal to 98.5 volume %, is more preferably more than or equal to 60 volume % and less than or equal to 97 volume %, and is further preferably more than or equal to 70 volume % and less than or equal to 95 volume %.

The lower limit of the content ratio of the hexagonal boron nitride grains in the composite sintered material is preferably more than or equal to 1.5 volume %, is more preferably more than or equal to 3 volume %, and is further preferably more than or equal to 5 volume %. The upper limit of the content ratio of the hexagonal boron nitride grains in the composite sintered material is preferably less than or equal to 50 volume %, is more preferably less than or equal to 40 volume %, and is further preferably less than or equal to 30 volume %. The content ratio of the hexagonal boron nitride grains in the composite sintered material is preferably more than or equal to 1.5 volume % and less than or equal to 50 volume %, is more preferably more than or equal to 3 volume % and less than or equal to 40 volume %, and is further preferably more than or equal to 5 volume % and less than or equal to 30 volume %.

The lower limit of the content ratio of the wurtzite type boron nitride grains in the composite sintered material is preferably more than or equal to 1.5 volume %, is more preferably more than or equal to 3 volume %, and is further preferably more than or equal to 5 volume %. The upper limit of the content ratio of the wurtzite type boron nitride grains in the composite sintered material is preferably less than or equal to 40 volume %, is more preferably less than or equal to 30 volume %, and is further preferably less than or equal to 20 volume %. The content ratio of the wurtzite type boron nitride grains in the composite sintered material is preferably more than or equal to 1.5 volume % and less than or equal to 40 volume %, is more preferably more than or equal to 3 volume % and less than or equal to 30 volume %, and is further preferably more than or equal to 5 volume % and less than or equal to 20 volume %.

In the composite sintered material of the present disclosure, the relationship of the following expression 1 is satisfied:

$$0.015 \le (Vh+Vw)/(Vc+Vh+Vw) \le 0.5, \quad \text{Expression 1:}$$

where Vc represents the volume-based content ratio of the cubic boron nitride grains, Vh represents the volume-based content ratio of the hexagonal boron nitride grains, and Vw represents the volume-based content ratio of the wurtzite type boron nitride grains.

In the composite sintered material satisfying the relationship of expression 1, the ratio of the total of the hexagonal boron nitride grains and the wurtzite type boron nitride grains to the total of the cubic boron nitride grains, the hexagonal boron nitride grains and the wurtzite type boron nitride grains is more than or equal to 1.5 volume % and less than or equal to 50 volume %. Each of the hexagonal boron nitride and the wurtzite type boron nitride has low frictional resistance during wire drawing, and can provide slidability to the composite sintered material. Therefore, the composite sintered material with the above-described ratio of the hexagonal boron nitride and the wurtzite type boron nitride has excellent slidability, and is less likely to be adhered to a wire or break the wire due to generation of frictional heat even in a wire drawing process, and can attain a long tool life.

Further, the hexagonal boron nitride and the wurtzite type boron nitride are softer than the cubic boron nitride, and therefore can have excellent crack propagation resistance. Therefore, a crack is less likely to be generated in a tool using the composite sintered material even in a wire drawing process, and the tool can have a long tool life.

Further, in the composite sintered material of the present disclosure, the ratio of the cubic boron nitride grains to the total of the cubic boron nitride grains, the hexagonal boron nitride grains, and the wurtzite type boron nitride grains is more than or equal to 50 volume % and less than or equal to 98.5 volume %. Each of the cubic boron nitride grains has high hardness, excellent toughness, high crystallinity, and high thermal diffusivity. Therefore, a tool using the composite sintered material with the above-described ratio of the cubic boron nitride grains has excellent wear resistance even in a wire drawing process, is less likely to be adhered due to generation of frictional heat, and can have a long tool life.

Volume-based content ratio Vc of the cubic boron nitride grains, volume-based content ratio Vh of the hexagonal boron nitride grains, and volume-based content ratio Vw of the wurtzite type boron nitride grains preferably satisfy a relationship of the following expression 2, and more preferably satisfies a relationship of the following expression 3.

$$0.03 \le (Vh+Vw)/(Vc+Vh+Vw) \le 0.4 \quad \text{Expression 2:}$$

$$0.05 \le (Vh+Vw)/(Vc+Vh+Vw) \le 0.3 \quad \text{Expression 3:}$$

Volume-based content ratio Vh of the hexagonal boron nitride grains and volume-based content ratio Vw of the wurtzite type boron nitride grains preferably satisfy a relationship of the following expression 4, and more preferably satisfies a relationship of the following expression 5.

$$0.05 \le Vh/(Vh+Vw) \le 1 \quad \text{Expression 4:}$$

$$0.1 \le Vh/(Vh+Vw) \le 0.95 \quad \text{Expression 5:}$$

With this, the composite sintered material has high slidability and excellent crack propagation resistance.

Each of the volume-based content ratios (volume %) of the cubic boron nitride grains, the hexagonal boron nitride grains, and the wurtzite type boron nitride grains in the composite sintered material can be measured by an X-ray diffraction method. A specific measurement method thereof is as follows.

The composite sintered material is cut using a diamond wheel electrodeposition wire, and a cutting surface thereof is employed as an observation surface.

An X-ray diffractometer ("MiniFlex600" (trade name) provided by Rigaku) is used to obtain an X-ray spectrum of the cut surface of the composite sintered material. Conditions for the X-ray diffractometer on this occasion are as follows.

Characteristic X-ray: Cu-Kα (wavelength of 1.54 Å)
Tube voltage: 45 kV
Tube Current: 40 mA
Filter: multilayer mirror
Optical system: concentration method
X-ray diffraction method: θ-2θ method.

In the obtained X-ray spectrum, the following peak intensity A, peak intensity B, and peak intensity C are measured.

Peak intensity A: a peak intensity of the hexagonal boron nitride with background being excluded from a peak intensity around each of diffraction angles 2θ=26° and 28.5°. When there are two peaks around 26° and 28.5°, the total value of the peak intensities of the two is regarded as the peak intensity of the hexagonal boron nitride.

Peak intensity B: a peak intensity of the wurtzite type boron nitride with background being excluded from a peak intensity around a diffraction angle 2θ=40.8°.

Peak intensity C: a peak intensity of the cubic boron nitride with background being excluded from a peak intensity around a diffraction angle 2θ=43.5°.

The content ratio of the hexagonal boron nitride grains is obtained by calculating the value of peak intensity A/(peak intensity A+peak intensity B+peak intensity C). The content ratio of the wurtzite type boron nitride grains is obtained by calculating the value of peak intensity B/(peak intensity A+peak intensity B+peak intensity C). The content ratio of the cubic boron nitride grains is obtained by calculating the value of peak intensity C/(peak intensity A+peak intensity B+peak intensity C). Since the hexagonal boron nitride, the compressed hexagonal boron nitride, the wurtzite type boron nitride, and the cubic boron nitride have comparable electron density, the above-described X-ray peak intensity ratio can be regarded as the volume ratio in the composite sintered material. Further, since the content of the inevitable impurity is small, the content of the inevitable impurity does not affect the calculation of each of the content ratios (volume %) of the cubic boron nitride grains, the hexagonal boron nitride grains, and the wurtzite type boron nitride grains in the composite sintered material.

<Dislocation Density of Cubic Boron Nitride Grains>

In the composite sintered material of the present disclosure, the dislocation density of the cubic boron nitride grains is more than or equal to $1\times10^{15}/m^2$ and less than or equal to $1\times10^{17}/m^2$. Each of the cubic boron nitride grains has high hardness, excellent toughness, high crystallinity, and high thermal diffusivity. Therefore, a tool using the composite sintered material including such cubic boron nitride grains has excellent wear resistance even in a wire drawing process, is less likely to be adhered due to generation of frictional heat, and can have a long tool life.

In order to improve toughness and thermal diffusivity, the upper limit of the dislocation density of the cubic boron nitride grains is preferably less than or equal to $3\times10^{16}/m^2$, and is more preferably less than or equal to $5\times10^{15}/m^2$. In order to maintain high hardness and excellent wear resistance, the lower limit of the dislocation density of the cubic boron nitride is preferably more than or equal to $1\times10^{15}$ m². The dislocation density of the cubic boron nitride grains is preferably more than or equal to $1\times10^{15}/m^2$ and less than or equal to $3\times10^{16}/m^2$, and is more preferably more than or equal to $1\times10^{15}/m^2$ and less than or equal to $5\times10^{15}/m^2$.

In the present specification, the dislocation density is calculated in the following procedure.

A specimen constituted of the composite sintered material is prepared. The specimen is sized to have an observation surface of 2.0 mm×2.0 mm and have a thickness of 1.0 mm. The observation surface of the specimen is polished.

The observation surface of the specimen is subjected to an X-ray diffraction measurement under the following conditions to obtain line profiles of diffraction peaks from respective orientation planes of (111), (200), (220), (311), (400), and (331), which are major orientations of the cubic boron nitride.

(X-Ray Diffraction Measurement Conditions)
X-ray source: synchrotron radiation
Device condition: detector NaI (fluorescence is cut with appropriate ROI)
Energy: 18 keV (wavelength: 0.6888 angstrom)
Analyzing crystal: Si (111)
Incident slit: a width of 5 mm×a height of 0.5 mm
Light receiving slit: double slit (a width of 3 mm×a height of 0.5 mm)
Mirror: platinum-coated mirror
Incident angle: 2.5 mrad
Scanning method: 2θ-θ scan
Measurement peak: six peaks from cubic boron nitride's (111), (200), (220), (311), (400), and (331). When it is difficult to obtain a profile depending on texture and orientation, the peak for that Miller index is excluded.
Measuring condition: there are 9 or more measurement points in the half width. Peak top intensity is set to 2000 counts or more. Peak tail is also used in the analysis, and accordingly, the measurement range is set to about 10 times the half width.

A line profile obtained from the above X-ray diffraction measurement will be a profile including both a true broadening attributed to a physical quantity such as the sample's inhomogeneous strain and a broadening attributed to the equipment. In order to determine inhomogeneous strain and crystallite size, a component attributed to the equipment is removed from the measured line profile to obtain a true line profile. The true line profile is obtained by fitting the obtained line profile and the line profile that is attributed to the equipment by a pseudo Voigt function, and subtracting the line profile attributed to the equipment. $LaB_6$ is used as a standard sample for removing a broadening of a diffracted wave attributed to the equipment. When significantly collimated synchrotron radiation is used, a broadening of a diffracted wave attributed to the equipment can be regarded as zero.

The obtained true line profile is analyzed using the modified Williamson-Hall method and the modified Warren-Averbach method to calculate dislocation density. The modified Williamson-Hall method and the modified Warren-Averbach method are known line profile analysis methods used for determining dislocation density.

The modified Williamson-Hall method's expression is represented by the following expression (1):

$$\Delta K = \frac{0.9}{D} + \left(\frac{\pi M^1 b^2}{2}\right)^{1/2} \rho^{1/2} KC^{1/2} + O(K^2 C) \quad (1)$$

where $\Delta K$ represents a half width of a line profile, D represents a crystallite size, M represents a dislocation arrangement parameter, b represents a Burgers vector, ρ represents dislocation density, K represents a scattering vector, $O(K^2C)$ represents a higher-order term of $K^2C$, and C represents an average contrast factor.

C in the above expression (I) is represented by the following expression (II):

$$C=C_{h00}[1-q(h^2k^2+h^2l^2+k^2l^2)/(h^2+k^2+l^2)] \quad (II)$$

In the above expression (II), a contrast factor $C_{h00}$ for screw dislocation and that for edge dislocation and a coefficient q for each contrast factor are obtained by using the computing code ANIZC, with a slip system of <110>{111}, and elastic stiffness $C_{11}$, $C_{12}$ and $C_{44}$ of 8.44 GPa, 1.9 GPa, and 4.83 GPa, respectively. Contrast factor $C_{h00}$, is 0.203 for screw dislocation and 0.212 for edge dislocation. The coefficient q for the contrast factor is 1.65 for screw dislocation and 0.58 for edge dislocation. Note that screw dislocation's ratio is fixed to 0.5 and edge dislocation's ratio is fixed to 0.5.

Furthermore, between dislocation and inhomogeneous strain, a relationship represented by an expression (III) is established using contrast factor C, as below:

$$<\varepsilon(L)^2> = (\rho C b^2/4\pi)\ln(R_e/L) \quad (III)$$

where $R_e$ represents dislocation's effective radius.

By the relationship of the above expression (III) and the Warren-Averbach expression, the following expression (IV) can be presented, and as the modified Warren-Averbach method, dislocation density ρ and a crystallite size can be determined.

$$\ln A(L) = \ln A^S(L) - (\pi L^2 \rho b^2/2)\ln(R_e/L)(K^2C) + O(K^2C) \quad (V)$$

where A(L) represents a Fourier series, $A^S(L)$ represents a Fourier series for a crystallite size, and L represents a Fourier length.

For details of the modified Williamson-Hall method and the modified Warren-Averbach method, see T. Ungar and A. Borbely, "The effect of dislocation contrast on x-ray line broadening: A new approach to line profile analysis," Appl. Phys. Lett., vol. 69, no. 21, p. 3173, 1996, and T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, no. 10, pp. 3693-3699, 1998.

<Median Diameter d50 of Cubic Boron Nitride Grains>

In the composite sintered material of the present disclosure, median diameter d50 of the equivalent circle diameters of the cubic boron nitride grains (hereinafter, also referred to as "grain size") is more than or equal to 10 nm and less than or equal to 500 nm. The composite sintered material including such cubic boron nitride grains has excellent strength, improved toughness, and excellent crack propagation resistance, Therefore, a crack is less likely to be generated in a tool using the composite sintered material even in a wire drawing process, and the tool can have a long tool life.

In order to ensure excellent strength and toughness, the upper limit of median diameter d50 of the equivalent circle diameters of the cubic boron nitride grains is less than or equal to 500 nm, and is preferably less than or equal to 100 nm. In view of production, the lower limit of median diameter d50 of the equivalent circle diameters of the cubic boron nitride grains is more than or equal to 10 nm. Median diameter d50 of the equivalent circle diameters of the cubic boron nitride grains is preferably more than or equal to 10 nm and less than or equal to 300 nm, and is more preferably more than or equal to 10 nm and less than or equal to 100 nm.

(Method of Measuring Median Diameter d50)

In the present specification, median size d50 of the equivalent circle diameters of the plurality of cubic boron nitride grains included in the composite sintered material refers to a value obtained by calculating an average value of respective median sizes d50 of a plurality of cubic boron nitride grains measured at five arbitrarily selected measurement portions.

In the measurement performed by the Applicant, as long as median sizes d50 are measured in the same sample, results of measurement were not substantially varied even when measurement visual fields to be selected in the composite sintered material were changed and calculation was performed multiple times. It was confirmed that the results of measurement are not intentional even when a measurement visual field is set arbitrarily.

When the composite sintered material is used as a portion of a tool, the portion of the composite sintered material is cut out using a diamond wheel electrodeposition wire or the like, and a cut cross section is polished, and five measurement portions are set arbitrarily in the polished surface.

The following specifically describes the method of measuring median size d50 of the equivalent circle diameters of the plurality of cubic boron nitride grains at each of the measurement portions.

The composite sintered material is cut using a diamond wheel electrodeposition wire or the like to expose each of the measurement portions and a cut surface thereof is polished. Each measurement portion on the polished surface is observed using SEM ("JSM-7500F" (trade name) provided by JEOL), thereby obtaining a SEM image. The size of the measurement visual field is set to 12 μm×15 μm and the observation magnification is set to 10000×.

For each of the five SEM images, the distribution of the equivalent circle diameters of the cubic boron nitride grains is calculated using image processing software (Win Roof ver. 7.4.5) with grain boundaries between the crystal grains observed in the measurement visual field being separated from each other.

Median size d50 is calculated with the whole of the measurement visual field being a denominator. From the distribution of the equivalent circle diameters of the cubic boron nitride grains, median size d50 is calculated.

Second Embodiment: Tool

The tool of the present disclosure is a tool using the composite sintered material of the first embodiment. Specifically, the tool is suitably used for a cutting tool, a wear-resistant tool, a grinding tool, or the like.

Each of the cutting tool, the wear-resisting tool and the grinding tool using the composite sintered material of the present disclosure may be entirely constituted of the composite sintered material, or only a portion thereof (for example, a cutting edge portion in the case of the cutting tool) may be constituted of the composite sintered material. Moreover, a coating film may be formed on a surface of each of the tools.

Examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Examples of the wear-resistant tool include a die, a scriber, a scribing wheel, a dresser, and the like. Examples of the grinding tool include a grinding stone and the like.

Third Embodiment: Method of Manufacturing Composite Sintered Material

Figure 2:
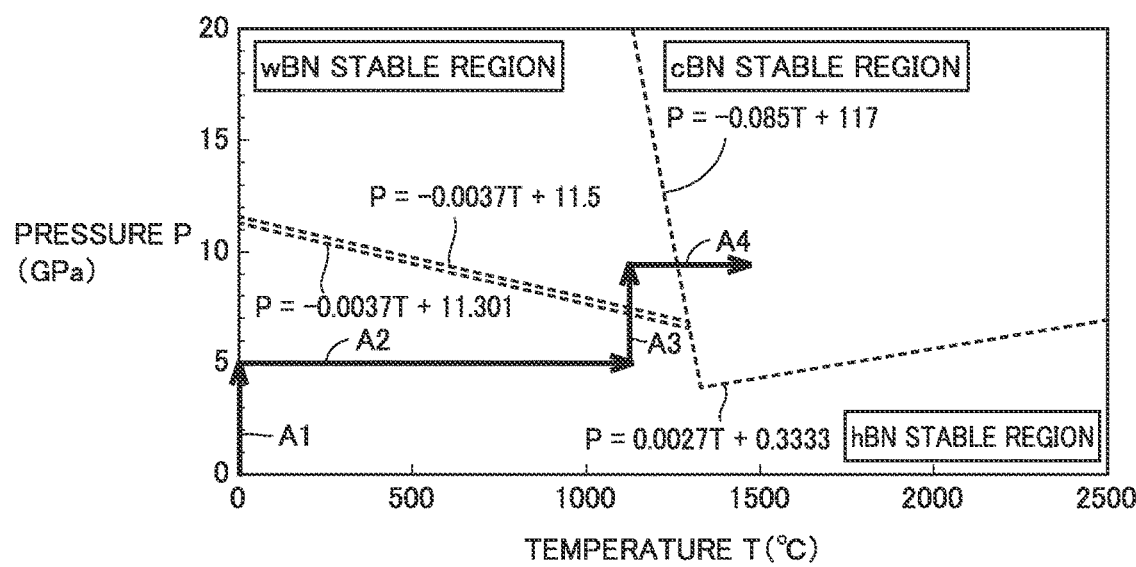
FIG. 2 is a diagram for illustrating an exemplary method of manufacturing a composite sintered material of the present disclosure.
Figure 3:
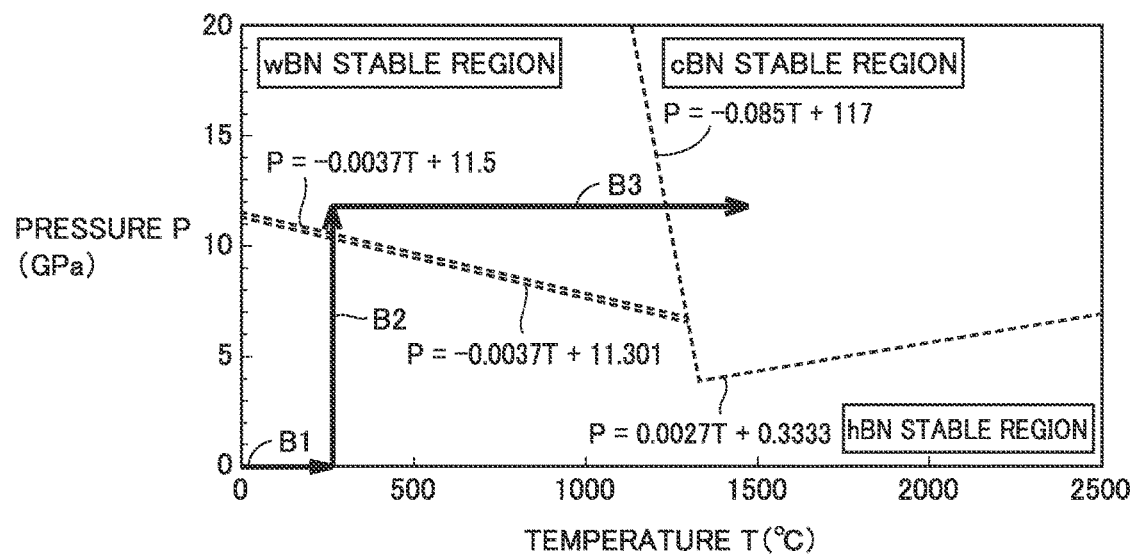
FIG. 3 is a diagram for illustrating another exemplary method of manufacturing the composite sintered material of the present disclosure.
Figure 4:
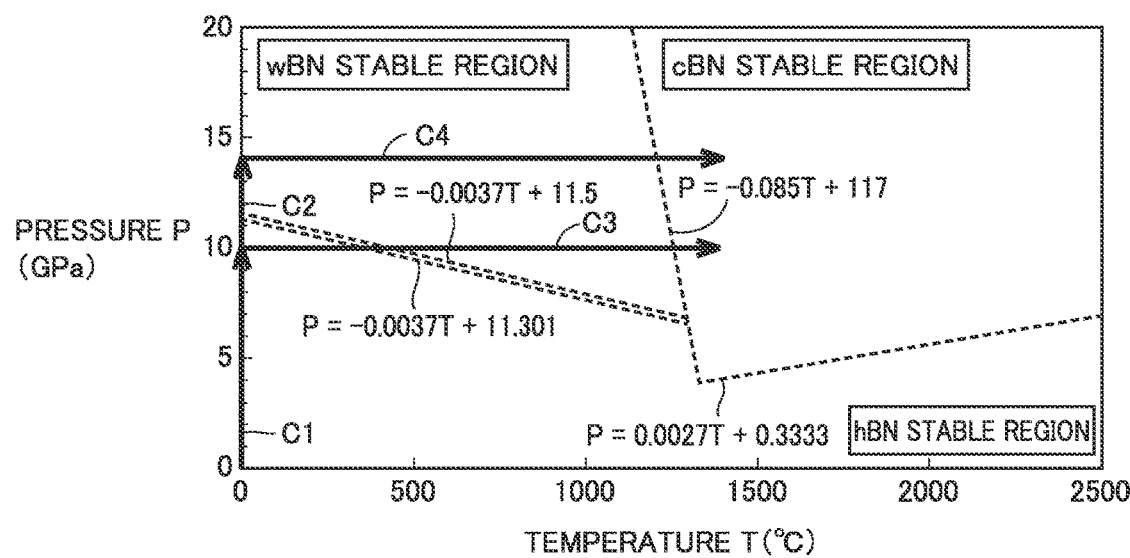
FIG. 4 is a diagram for illustrating still another exemplary method of manufacturing the composite sintered material of the present disclosure.

A specific example of a method of manufacturing the composite sintered material of the present disclosure will be described with reference to FIGS. 1 to 4. FIG. 1 is a pressure-temperature phase diagram of boron nitride. Each of FIGS. 2 to 4 is a diagram for illustrating an exemplary method of manufacturing the composite sintered material of the present disclosure.

First, the pressure-temperature phase diagram of boron nitride will be described in order to facilitate understanding of the method of manufacturing the composite sintered material. As shown in FIG. 1, boron nitride has the following three phases: hexagonal boron nitride, which is a stable phase at normal temperature and normal pressure; cubic boron nitride, which is a stable phase at high temperature and high pressure; and wurtzite type boron nitride, which is a metastable phase in the course of conversion from hexagonal boron nitride to cubic boron nitride.

A boundary of each phase can be indicated by a linear function. In the present specification, the temperature and pressure within the stable region of each phase can be indicated using a linear function.

In the present specification, the temperature and pressure in the stable region of the wurtzite type boron nitride (indicated as "wBN stable region" in FIG. 1) are defined as temperature and pressure that satisfy the following expressions (1) and (2) simultaneously:

$$P \geq -0.0037T + 11.301 \quad \text{Expression (1)}$$

$$P \leq -0.085T + 117, \quad \text{Expression (2)}$$

where the temperature is represented by T (° C.) and the pressure is represented by P (GPa).

In the present specification, the temperature and pressure in the stable region of the hexagonal boron nitride (indicated as "hBN stable region" in FIG. 1) are defined as temperature and pressure that satisfy the following expressions A and B simultaneously or are defined as temperature and pressure that satisfy the following expressions C and ID simultaneously:

$$P \leq -0.0037T + 11.301 \quad \text{Expression A}$$

$$P \leq -0.085T + 117 \quad \text{Expression B}$$

$$P \leq 0.0027T + 0.3333 \quad \text{Expression C}$$

$$P \geq -0.085T + 117, \quad \text{Expression D}$$

where the temperature is represented by T (° C.) and the pressure is represented by P (GPa).

In the present specification, the temperature and pressure in the stable region of the cubic boron nitride (indicated as "cBN stable region" in FIG. 1) are defined as temperature and pressure that satisfy the following expressions D and E simultaneously:

$$P \geq -0.085T + 117, \quad \text{Expression D}$$

$$P \geq 0.0027T + 0.3333, \quad \text{Expression E}$$

where the temperature is represented by T (° C.) and the pressure is represented by P (GPa).

In the method of manufacturing the composite sintered material of the present disclosure, hexagonal boron nitride or pyrolytic boron nitride is used as a source material. At least part of the source material can be converted into cubic boron nitride by applying heat and pressure onto the hexagonal boron nitride or pyrolytic boron nitride up to the temperature and pressure falling within the stable region of the cubic boron nitride. The present inventors have diligently examined heat/pressure application paths in the heat and pressure application process as well as a holding time at certain temperature and certain pressure, thus newly finding a heat/pressure application condition under which the composite sintered material of the present disclosure can be obtained.

Details of each step of the method of manufacturing the composite sintered material of the present disclosure will be described below with reference to FIGS. 2 to 4. It should be noted that in each of FIGS. 2 to 4, arrows indicate a heat/pressure application path. The paths shown in FIGS. 2 to 4 are merely exemplary and the paths are not limited thereto.

<Preparation Step>

Hexagonal boron nitride powder or pyrolytic boron nitride is prepared as the source material of the composite sintered material. The purity (the content ratio of the hexagonal boron nitride) of the hexagonal boron nitride powder is preferably more than or equal to 98.5%, is more preferably more than or equal to 99%, and is most preferably 100%. The particle size of the hexagonal boron nitride powder is not particularly limited, but may be, for example, more than or equal to 0.1 μm and less than or equal to 10 μm.

The pyrolytic boron nitride has a very fine particle size due to pyrolysis and is therefore less likely to undergo grain growth. Therefore, when the pyrolytic boron nitride is used as the source material, the grain sizes of the cubic boron nitride grains in the obtained composite sintered material tends to be small. As the pyrolytic boron nitride, pyrolytic boron nitride produced by a conventionally known synthesis method or commercially available pyrolytic boron nitride can be used.

<Heat/Pressure Application Step>

Next, the hexagonal boron nitride powder or pyrolytic boron nitride is subjected to application of heat and pressure so as to pass through the temperature and pressure in the stable region of the wurtzite type boron nitride and reach the temperature and pressure in the stable region of the cubic boron nitride.

The heat/pressure application path is appropriately adjusted to obtain the composite sintered material of the first embodiment. For example, as shown in FIG. 2, pressure is applied to the hexagonal boron nitride powder or pyrolytic boron nitride from a starting point (25° C. and 0 GPa) while maintaining the temperature (arrow A1).

Then, heat is applied while maintaining the pressure (arrow A2). Then, pressure is applied while maintaining the temperature (arrow A3). Then, heat is applied while maintaining the pressure (arrow A4). In this way, the temperature and pressure in the stable region of the cubic boron nitride are reached, thereby obtaining the composite sintered material of the present disclosure. Regarding the heat/pressure application path of FIG. 2, the heat/pressure application path enters the stable region of the wurtzite type boron nitride during the second round of application of pressure as indicated by arrow A3.

On the other hand, as shown in FIG. 3, heat is applied to the hexagonal boron nitride powder or pyrolytic boron nitride from the starting point (25° C. and 0 GPa) while maintaining the pressure (arrow B1). Then, pressure is applied while maintaining the temperature (arrow B2). Then, heat is applied while maintaining the pressure (arrow B3). In this way, the temperature and pressure in the stable region of the cubic boron nitride are reached, thereby obtaining the composite sintered material of the present disclosure. Regarding the heat/pressure application path of FIG. 3, the heat/pressure application path enters the stable region of the wurtzite type boron nitride during the first round of application of pressure as indicated by arrow B2.

FIG. 4 shows a heat/pressure application path indicated by arrows C1 and C3 and a heat/pressure application path indicated by arrows C2 and C4. As shown in FIG. 4, pressure is applied to the hexagonal boron nitride powder or pyrolytic boron nitride from the starting point (25° C. and 0 GPa) while maintaining the temperature (arrow C1, arrow C2). Then, heat is applied while maintaining the pressure (arrow C3, arrow C4). In this way, the temperature and pressure in the stable region of the cubic boron nitride are reached, thereby obtaining the composite sintered material of the present disclosure. Regarding the heat/pressure application paths of FIG. 4, the heat/pressure application path enters the stable region of the wurtzite type boron nitride during the first round of application of heat as indicated by arrow C3 or the heat/pressure application path enters the stable region of the wurtzite type boron nitride during the first round of application of pressure as indicated by arrow C2.

In each of the heat/pressure application paths shown in FIGS. 2 to 4, the temperature to be finally reached in the stable region of the cubic boron nitride can be, for example, more than or equal to 1200° C. and less than 2500° C., and the pressure can be more than or equal to 6 GPa and less than or equal to 20 GPa. The holding time at the temperature and pressure can be more than or equal to 1 minute and less than or equal to 30 minutes. With this, the whole of the source material is not converted to cubic boron nitride, and the hexagonal boron nitride grains or the hexagonal boron nitride grains and the wurtzite type boron nitride grains can remain in the composite sintered material.

The dislocation density of the cubic boron nitride grains in the composite sintered material can be increased by increasing the holding time in the stable region of the cubic boron nitride. Further, the dislocation density of the cubic boron nitride grains in the composite sintered material can be increased by holding, for more than or equal to 3 minutes, at temperature and pressure between a dotted line indicated by P=−0.0037 T+11.5 and a boundary (P=−0.0037 T+11.301) within the stable region of the wurtzite type between the stable region of the hexagonal boron nitride and the stable region of the wurtzite type boron nitride as shown in FIGS. 2 to 4.

<Clauses>

The above description includes embodiments described below.

(Clause 1)

A composite sintered material comprising:

cubic boron nitride grains; and hexagonal boron nitride grains or the hexagonal boron nitride grains and wurtzite type boron nitride grains, wherein a dislocation density of the cubic boron nitride grains is more than or equal to $1\times10^{15}/m^2$ and less than or equal to $1\times10^{17}/m^2$, a median diameter d50 of equivalent circle diameters of the cubic boron nitride grains is more than or equal to 10 nm and less than or equal to 500 nm, and a relationship of the following expression 1 is satisfied:

$0.015 \leq (Vh+Vw)/(Vc+Vh+Vw) \leq 0.5$,     Expression 1:

where Vc represents a volume-based content ratio of the cubic boron nitride grains, Vh represents a volume-based content ratio of the hexagonal boron nitride grains, and Vw represents a volume-based content ratio of the wurtzite type boron nitride grains.

(Clause 2)

The composite sintered material according to clause 1, wherein a relationship of the following expression 4 is satisfied:

$0.05 \leq Vh/(Vh+Vw) \leq 1$,     Expression 4:

where Vh represents the volume-based content ratio of the hexagonal boron nitride grains, and Vw represents the volume-based content ratio of the wurtzite type boron nitride grains.

EXAMPLES

The following describes the present embodiment more specifically by way of examples. However, the present embodiment is not limited by these examples.

Example 1

In an Example 1, a composite sintered material was produced using hexagonal boron nitride as a source material, and examination was performed as to a relationship between the configuration (the composition, the median diameter of the crystal grains, and the dislocation density) of the composite sintered material and a tool life attained when a wire drawing process for a stainless steel wire was performed using a die that employed the composite sintered material.

<Production of Composite Sintered Material>

Each of composite sintered materials of samples 1 to 17 was produced in accordance with the following procedure.

(Preparation Step)

6 g of hexagonal boron nitride powder ("DENKA boron nitride" (trade name) manufactured by DENKA with a particle size of 5 μm) was prepared. The hexagonal boron nitride powder was introduced into a capsule composed of molybdenum and the capsule was placed in an ultrahigh-pressure high-temperature generator.

(Heat/Pressure Application Step)

[Samples 1 to 6, 8 and 9]

The ultrahigh-pressure high-temperature generator was used to increase the temperature or pressure of the hexagonal boron nitride powder from the temperature and pressure described in the columns "Temperature" and "Pressure" of "Start Point" in Table 1 to attain the temperature and pressure described in the columns "Reached Temperature" and "Reached Pressure" of "First Stage".

Then, the temperature or pressure was increased to attain the temperature and pressure described in the columns "Reached Temperature" and "Reached Pressure" of "Second Stage" in Table 1, and holding was performed for a duration of time described in the column "Holding Time". When "0" is described in the "Holding Time", transition was immediately made to a below-described "Third Stage".

Then, the pressure was increased to attain the temperature and pressure described in the columns "Reached Temperature" and "Reached Pressure" of "Third Stage" in Table 1 and holding was performed for a duration of time described in the column "Holding Time". When "0" is described in the "Holding Time", transition was immediately made to a below-described "Fourth Stage".

Then, the temperature was increased to attain the temperature and pressure described in the columns "Reached Temperature" and "Reached Pressure" of "Fourth Stage" in Table 1, and holding was performed for a duration of time described in the column "Holding Time". In this way, the composite sintered material was obtained.

[Samples 7 and 11 to 17]

The ultrahigh-pressure high-temperature generator was used to increase the temperature or pressure of the hexagonal boron nitride powder from the temperature and pressure described in the columns "Temperature" and "Pressure" of "Start Point" in Table 1 to attain the temperature and pressure described in the columns "Reached Temperature"

and "Reached Pressure" of "First Stage" and holding was performed for a duration of time described in the column "Holding Time". When "0" is described in the "Holding Time", transition was immediately made to a below-described "Third Stage".

Then, the temperature or pressure was increased to attain the temperature and pressure described in the columns "Reached Temperature" and "Reached Pressure" of "Second Stage" in Table 1, and holding was performed for a duration of time described in the column "Holding Time". When "0" is described in the "Holding Time", transition was immediately made to a below-described "Third Stage".

Then, the temperature or pressure was increased to attain the temperature and pressure described in the columns "Reached Temperature" and "Reached Pressure" of "Third Stage" in Table 1 and holding was performed for a duration of time described in the column "Holding Time". In this way, the composite sintered material was obtained.

[Sample 10]

The ultrahigh-pressure high-temperature generator was used to increase the pressure of the hexagonal boron nitride powder from the temperature and pressure described in the columns "Temperature" and "Pressure" of "Start Point" in Table 1 to attain the temperature and pressure described in the columns "Reached Temperature" and "Reached Pressure" of "First Stage".

Then, the temperature was increased to attain the temperature and pressure described in the columns "Reached Temperature" and "Reached Pressure" of "Second Stage" in Table 1, and holding was performed for a duration of time described in the column "Holding Time". In this way, the composite sintered material was obtained.

In each of samples 1 to 12, the heat/pressure application path passed through the stable region of the wurtzite type boron nitride. An entry temperature for the stable region of the wurtzite type boron nitride in each sample is shown in the column "wBN Stable Region Entry Temperature" in Table 1 In each of samples 13 to 17, the heat/pressure application path did not pass through the stable region of the wurtzite type boron nitride. In this case, "None" is shown in the column "wBN Stable Region Entry Temperature" in Table 1.

<Evaluation>

(Measurement of Composition)

The content ratios (volume %) of the cubic boron nitride grains, the hexagonal boron nitride grains, and the wurtzite type boron nitride grains in each of the obtained composite sintered materials were measured by an X-ray diffraction method. A specific manner of the X-ray diffraction method has been as described in the first embodiment and therefore will not be repeatedly described. Results thereof are shown in the columns "cBN Volume %", "hBN Volume %", and "wBN Volume %" in Table 1. Based on these results, the value of $(Vh+Vw)/(Vc+Vh+Vw)$ was also calculated. Results thereof are shown in the column "Vh+Vw/Vc+Vh+Vw" in Table 1.

It should be noted that in each of the samples, components other than cBN, hBN, and wvBN were not identified.

(Measurement of Dislocation Density)

The dislocation density of the cubic boron nitride grains in the obtained composite sintered material was calculated by analyzing, using the modified Williamson-Hall method and the modified Warren-Averbach method, a line profile obtained by the X-ray diffraction measurement. A specific manner of calculating the dislocation density has been described in the first embodiment, and therefore will not be repeatedly described. Results thereof are shown in the column "cBN Dislocation Density" of Table 1.

(Measurement of Median Diameter d50)

Median diameter d50 of the equivalent circle diameters of the cubic boron nitride grains included in the obtained composite sintered material was measured. A specific manner thereof has been described in the first embodiment, and therefore will not be repeatedly described. Results thereof are shown in the column "Median Diameter d50" of Table 1.

(Wire Drawing Test)

A through hole was formed in the obtained composite sintered material by laser irradiation, thereby producing a die in which a central portion was composed of the composite sintered material and its surroundings were coated with a metal. A minimum value φ of the diameter of the through hole was 0.1 mm.

The die was used to perform a wire drawing test for a wire material (wire diameter φ: 110 μm; material: SUS304). No lubricant was used during the wire drawing. A wire drawing speed was 150 n/min and an area reduction ratio was 17%.

The wire drawing was performed under the above condition A wire drawing time until a point of time at which surface roughness Ra of the wire material became 0.020 μm was determined as the tool life. Surface roughness Ra of the wire material was measured using a laser microscope ("VK-X100" (trademark) manufactured by KEYENCE) based on ISO25178. The tool life of each sample is shown as a ratio in the case where the tool life of a die produced using a commercially available single crystal diamond (manufactured by Sumitomo Electric Hardmetal) when wire drawing is performed using the die under the same condition as described above is assumed as "1". Results thereof are shown in Table 1. A larger numerical value indicates that the surface condition of the wire material is less likely to be deteriorated and the tool life is longer.

TABLE 1

| | Heat/Pressure Application Step | | | | | | | | | |
|---|---|---|---|---|---|---|---|---|---|---|
| | Start Point | | First Stage | | | Second Stage | | | Third Stage | | |
| Sample No. | Temperature °C. | Pressure GPa | Reached Temperature °C. | Reached Pressure GPa | Holding Time Minute | Reached Temperature °C. | Reached Pressure GPa | Holding Time Minute | Reached Temperature °C. | Reached Pressure GPa | Holding Time Minute |
| 1 | 25 | 0 | 25 | 5 | 0 | 1280 | 5 | 0 | 1280 | 6.6 | 0 |
| 2 | 25 | 0 | 25 | 5 | 0 | 1170 | 5 | 0 | 1170 | 7 | 0 |
| 3 | 25 | 0 | 25 | 5 | 0 | 1200 | 5 | 0 | 1200 | 7.5 | 0 |
| 4 | 25 | 0 | 25 | 6 | 0 | 1280 | 5 | 0 | 1280 | 6.6 | 3 |
| 5 | 25 | 0 | 25 | 5 | 0 | 1170 | 5 | 0 | 1170 | 7 | 60 |
| 6 | 25 | 0 | 25 | 5 | 0 | 1030 | 5 | 0 | 1030 | 7.5 | 15 |

TABLE 1-continued

| Sample No. | | | | | | | | | | | |
|---|---|---|---|---|---|---|---|---|---|---|---|
| 7 | 25 | 0 | 25 | 11.25 | 3 | 25 | 13 | 10 | 1500 | 13 | 10 |
| 8 | 25 | 0 | 250 | 0 | 0 | 250 | 10.4 | 20 | 250 | 12 | 0 |
| 9 | 25 | 0 | 350 | 0 | 0 | 350 | 10.05 | 30 | 350 | 11 | 10 |
| 10 | 25 | 0 | 25 | 14 | 0 | 1400 | 14 | 15 | — | — | — |
| 11 | 25 | 0 | 400 | 0 | 0 | 400 | 10 | 0 | 1500 | 10 | 10 |
| 12 | 25 | 0 | 600 | 0 | 0 | 600 | 16 | 0 | 1200 | 16 | 10 |
| 13 | 25 | 0 | 25 | 5 | 0 | 1900 | 5 | 0 | 1900 | 6.6 | 10 |
| 14 | 25 | 0 | 25 | 5 | 0 | 1900 | 5 | 0 | 1900 | 7.5 | 10 |
| 15 | 25 | 0 | 25 | 5 | 0 | 1500 | 5 | 0 | 1500 | 13 | 10 |
| 16 | 25 | 0 | 25 | 5 | 0 | 1500 | 5 | 0 | 2300 | 10 | 10 |
| 17 | 25 | 0 | 25 | 5 | 0 | 1500 | 5 | 0 | 2500 | 10 | 10 |

| | Fourth Stage | | | wBN Stable Region | Composite Sintered Material | | | | | | Wire Drawing |
|---|---|---|---|---|---|---|---|---|---|---|---|
| Sample No. | Reached Temperature °C. | Reached Pressure GPa | Holding Time Minute | Entry Temperature °C. | cBN Volume % | hBN Volume % | wBN Volume % | Vh + Vw/ Vc + Vh + Vw | Median Diameter d50 nm | cBN Dislocation Density ×10$^{15}$/m$^2$ | Test Tool Life |
| 1 | 2300 | 6.6 | 20 | 1280 | 65 | 35 | 0 | 0.35 | 430 | 4.8 | 5.1 |
| 2 | 1900 | 7 | 30 | 1170 | 70 | 28 | 2 | 0.30 | 106 | 17 | 5.3 |
| 3 | 2000 | 7.5 | 20 | 1200 | 94 | 4.5 | 1.5 | 0.06 | 230 | 3.9 | 4.8 |
| 4 | 1900 | 6.6 | 20 | 1280 | 53 | 46 | 1 | 0.47 | 122 | 5.5 | 3.9 |
| 5 | 2300 | 7 | 20 | 1170 | 88 | 10 | 2 | 0.12 | 390 | 73 | 3.5 |
| 6 | 1900 | 7.5 | 10 | 1030 | 80 | 17 | 3 | 0.20 | 116 | 10 | 3.8 |
| 7 | — | — | — | 25 | 91 | 1 | 8 | 0.09 | 42 | 7.5 | 4 |
| 8 | 1500 | 12 | 20 | 250 | 72 | 19 | 9 | 0.28 | 51 | 9.8 | 3.5 |
| 9 | 1500 | 11 | 30 | 350 | 64 | 27 | 9 | 0.36 | 41 | 20 | 3.9 |
| 10 | — | — | — | 25 | 93 | 1 | 6 | 0.07 | 54 | 4.5 | 4.1 |
| 11 | — | — | — | 400 | 65 | 30 | 5 | 0.35 | 59 | 2.1 | 4.9 |
| 12 | — | — | — | 600 | 87 | 2 | 11 | 0.13 | 35 | 2.4 | 5.5 |
| 13 | — | — | — | None | 54 | 5 | 1 | 0.46 | 121 | 0.8 | 2.2 |
| 14 | — | — | — | None | 93 | 5 | 2 | 0.07 | 110 | 0.7 | 2 |
| 15 | — | — | — | None | 91 | 1 | 8 | 0.09 | 44 | 0.8 | 2.4 |
| 16 | — | — | — | None | 100 | 0 | 0 | 0 | 250 | 8 | 2.5 |
| 17 | — | — | — | None | 100 | 0 | 0 | 0 | 720 | 10 | 1.3 |

<Analysis>

Samples 1 to 12 correspond to examples of the present disclosure. Samples 13 to 17 correspond to comparative examples.

It was confirmed that each of the dies of the examples of the present disclosure (samples 1 to 12) was less likely to cause deterioration of the surface condition of the wire material and had a longer tool life than each of the dies of the comparative examples (samples 13 to 17).

Regarding each of samples 13 to 15 (comparative examples), the dislocation density of the cubic boron nitride grains was less than $1 \times 10^{15}$ m$^2$, and the tool life was shorter than that of each of the examples of the present disclosure. This is presumably due to the following reason: as the hardness of the cubic boron nitride grains was decreased, the wear resistance of the composite sintered material was decreased, thereby facilitating deterioration of the surface condition of the wire material.

Regarding sample 16 (comparative example), the content ratio of the cubic boron nitride grains was 100 volume %, (Vh+Vw)/(Vc+Vh+Vw) was 0 (i.e., less than 0.0015), and the tool life was shorter than that of each of the examples of the present disclosure. This is presumably due to the following reason: since the composite sintered material included no hexagonal boron nitride and wurtzite type boron nitride, the slidability of the composite sintered material was low to cause high frictional heat due to the increased resistance and rapidly promote wear, with the result that the tool was likely to be adhered.

In sample 17 (comparative example), the content ratio of the cubic boron nitride grains was 100 volume %, (Vh+Vw)/(Vc+Vh+Vw) was 0 (i.e., less than 0.0015), median diameter d50 of the equivalent circle diameters of the cubic boron nitride grains was 720 nm (i.e., more than 500 nm), and the tool life was shorter than that of each of the examples of the present disclosure. This is presumably due to the following reasons: since the composite sintered material included no hexagonal boron nitride and wurtzite type boron nitride, the slidability of the composite sintered material was low to cause high frictional heat due to the increased resistance and rapidly promote wear, with the result that the tool is likely to be adhered; and since the grain sizes of the cubic boron nitride grains were large, strength and toughness were decreased to facilitate breakage of the composite sintered material, thereby facilitating deterioration of the surface condition of the wire material.

Example 2

In an Example 2, a composite sintered material was produced using pyrolytic boron nitride as a source material, and examination was performed as to a relationship between the configuration (the composition, the median diameter of the crystal grains, and the dislocation density) of the composite sintered material and a tool life attained when a wire drawing process for a stainless steel wire was performed using a die that employed the composite sintered material.

<Production of Composite Sintered Material>

Each of composite sintered materials of samples 2-1 to 2-9 was produced in accordance with the following procedure.

(Preparation Step)

6 g of pyrolytic boron nitride was prepared. The pyrolytic boron nitride was introduced into a capsule composed of molybdenum and the capsule was placed in an ultrahigh-pressure high-temperature generator.

(Heat/Pressure Application Step)

[Samples 2-3 and 2-6]

The ultrahigh-pressure high-temperature generator was used to increase the pressure of the pyrolytic boron nitride from the temperature and pressure described in the columns "Temperature" and "Pressure" of "Start Point" in Table 2 to attain the temperature and pressure described in the columns "Reached Temperature" and "Reached Pressure" of "First Stage". For each of the samples, the holding time was 0 minute and transition was immediately made to a below-described "Second Stage".

Then, the temperature was increased to attain the temperature and pressure described in the columns "Reached Temperature" and "Reached Pressure" of "Second Stage" in Table 2.

Then, the pressure was increased to attain the temperature and pressure described in the columns "Reached Temperature" and "Reached Pressure" of "Third Stage" in Table 2 and holding was performed for a duration of time described in the column "Holding Time". When "0" is described in the "Holding Time", transition was immediately made to a below-described "Fourth Stage".

Then, the temperature was increased to attain the temperature and pressure described in the columns "Reached Temperature" and the "Reached Pressure" of "Fourth Stage" in Table 2, and holding was performed for a duration of time described in the column "Holding Time". In this way, the composite sintered material was obtained.

[Samples 2-2, 2-7, and 2-8]

The ultrahigh-pressure high-temperature generator was used to increase the pressure of the pyrolytic boron nitride powder from the temperature and pressure described in the columns "Temperature" and "Pressure" of "Start Point" in Table 2 to attain the temperature and pressure described in the columns "Reached Temperature" and "Reached Pressure" of "First Stage".

Then, the temperature was increased to attain the temperature and pressure described in the columns "Reached Temperature" and "Reached Pressure" of "Second Stage" in Table 2, and holding was performed for a duration of time described in the column "Holding Time". When "0" is described in the "Holding Time", transition was immediately made to a below-described "Third Stage".

Then, the temperature and/or pressure were increased to attain the temperature and pressure described in the columns "Reached Temperature" and the "Reached Pressure" of "Third Stage" in Table 2, and holding was performed for a duration of time described in the column "Holding Time". In this way, the composite sintered material was obtained.

[Samples 2-1, 2-4, 2-5, and 2-9]

The ultrahigh-pressure high-temperature generator was used to increase the pressure of the pyrolytic boron nitride powder from the temperature and pressure described in the columns "Temperature" and "Pressure" of "Start Point" in Table 2 to attain the temperature and pressure described in the columns "Reached Temperature" and "Reached Pressure" of "First Stage", and holding was performed for a duration of time described in the column "Holding Time". When "0" is described in the "Holding Time", transition was immediately made to a below-described "Second Stage".

Then, the temperature was increased to attain the temperature and pressure described in the columns "Reached Temperature" and "Reached Pressure" of "Second Stage" in Table 2, and holding was performed for a duration of time described in the column "Holding Time". In this way, the composite sintered material was obtained.

In each of samples 2-1 to 2-6 and 2-9, the path of increasing the heat and pressure passed through the stable region of the wurtzite type boron nitride. An entry temperature for the stable region of the wurtzite type boron nitride in each sample is shown in the column "wBN Stable Region Entry Temperature" in Table 2. In each of samples 2-7 and 2-8, the path of increasing the heat and pressure did not pass through the stable region of the wurtzite type boron nitride.

<Evaluation>

(Measurement of Composition, Measurement of Dislocation Density, and Measurement of Median Diameter d50)

For each of the obtained composite sintered materials, the measurement of the composition, the measurement of the dislocation density of the cubic boron nitride grains, and the measurement of median diameter d50 were performed in the same manner as in Example 1. Results thereof are shown in the columns "cBN Volume %" "hBN Volume %", "wBN Volume %", "Vh+Vw/Vc+Vh+Vw", "cBN Dislocation Density", and "Median Diameter d50" in Table 2.

(Wire Drawing Test)

A through hole was formed in the obtained composite sintered material by laser irradiation, thereby producing a die. A minimum value φ of the diameter of the through hole was 0.1 mm. The die was used to perform a wire drawing test under the same conditions as in Example 1. Results thereof are shown in Table 2.

TABLE 2

| | | | Heat/Pressure Application Step | | | | | | | | |
|---|---|---|---|---|---|---|---|---|---|---|---|
| | Start Point | | First Stage | | | Second Stage | | | Third Stage | | |
| Sample No. | Temperature °C. | Pressure GPa | Reached Temperature °C. | Reached Pressure GPa | Holding Time Minute | Reached Temperature °C. | Reached Pressure GPa | Holding Time Minute | Reached Temperature °C. | Reached Pressure GPa | Holding Time Minute |
| 2-1 | 25 | 0 | 25 | 14 | 3 | 1300 | 14 | 20 | — | — | — |
| 2-2 | 25 | 0 | 25 | 10 | 0 | 400 | 10 | 10 | 1600 | 10 | 10 |
| 2-3 | 25 | 0 | 25 | 5 | 0 | 500 | 5 | 0 | 500 | 16 | 20 |
| 2-4 | 25 | 0 | 25 | 14 | 0 | 1400 | 14 | 15 | — | — | — |
| 2-5 | 25 | 0 | 25 | 10 | 0 | 1600 | 10 | 10 | — | — | — |
| 2-6 | 25 | 0 | 25 | 5 | 0 | 500 | 5 | 0 | 500 | 16 | 0 |
| 2-7 | 25 | 0 | 25 | 6 | 0 | 1300 | 6 | 0 | 1300 | 14 | 15 |
| 2-8 | 25 | 0 | 25 | 6 | 0 | 1600 | 6 | 0 | 1600 | 10 | 10 |
| 2-9 | 25 | 0 | 25 | 7 | 0 | 2500 | 7 | 10 | — | — | — |

TABLE 2-continued

| | Heat/Pressure Aplication Step | | | wBN Stable Region | Composite Sintered Material | | | | | | Wire Drawing |
|---|---|---|---|---|---|---|---|---|---|---|---|
| | Fourth Stage | | | | | | | | Median | cBN | |
| Sample No | Reached Temperature °C. | Reached Pressure GPa | Holding Time Minute | Entry Temperature °C. | cBN Volume % | hBN Volume % | wBN Volume % | Vh + Vw/ Vc + Vh + Vw | Diameter d50 nm | Dislocation Density ×10$^{15}$/m$^2$ | Test Tool Life |
| 2-1 | — | — | — | 25 | 78 | 10 | 12 | 0.22 | 22 | 6.6 | 5.8 |
| 2-2 | — | — | — | 352 | 95 | 2 | 3 | 0.05 | 45 | 5.1 | 6.5 |
| 2-3 | 1200 | 16 | 20 | 500 | 89 | 3 | 8 | 0.11 | 18 | 12 | 5.2 |
| 2-4 | — | — | — | 25 | 91 | 4 | 5 | 0.09 | 25 | 4.5 | 6.3 |
| 2-5 | — | — | — | 352 | 95 | 3 | 2 | 0.05 | 45 | 3.1 | 7.1 |
| 2-6 | 1200 | 16 | 20 | 500 | 89 | 4 | 7 | 0.11 | 18 | 3.3 | 5.5 |
| 2-7 | — | — | — | None | 74 | 12 | 14 | 0.26 | 25 | 0.9 | 2.4 |
| 2-8 | — | — | — | None | 85 | 10 | 5 | 0.15 | 66 | 0.8 | 2.3 |
| 2-9 | — | — | — | 1162 | 92 | 8 | 0 | 0.08 | 550 | 8.1 | 1.5 |

<Analysis>

Samples 2-1 to 2-6 correspond to examples of the present disclosure. Samples 2-7 to 2-9 correspond to comparative examples.

It was confirmed that each of the dies of the examples of the present disclosure (samples 2-1 to 2-6) had a longer tool life than that of each of the comparative examples (samples 2-7 to 2-9).

Regarding each of samples 2-7 and 2-8 (comparative examples), the dislocation density of the cubic boron nitride grains was less than 1×10$^{15}$ m$^2$, and the tool life was shorter than that of each of the examples of the present disclosure. This is presumably due to the following reason: as the hardness of the cubic boron nitride grains was decreased, the wear resistance of the composite sintered material was decreased, thereby facilitating deterioration of the surface condition of the wire material.

Regarding sample 2-9 (comparative example), median diameter d50 of the equivalent circle diameters of the cubic boron nitride grains was 550 nm (i.e., more than 500 nm), and the tool life was shorter than that of each of the examples of the present disclosure. This is presumably due to the following reason: since the grain sizes of the cubic boron nitride grains were large, strength and toughness were decreased to facilitate breakage of the composite sintered material, thereby facilitating deterioration of the surface condition of the wire material. It should be noted that although the path of increasing the temperature and pressure in sample 2-9 passed through the stable region of the wurtzite type boron nitride, the temperature to be finally reached in the stable region of the cubic boron nitride was as high as 2500° C., with the result that excessive grain growth was considered to occur.

Example 3

In an Example 3, a composite sintered material was produced using hexagonal boron nitride as a source material, and examination was made as to a relationship between the configuration of the composite sintered material (the composition, the total content of the alkali metal and the alkaline earth metal, the median diameter of the crystal grains, and the dislocation density) and a tool life attained when a wire drawing process for a stainless steel wire was performed using a die that employed the composite sintered material.

<Production of Composite Sintered Material>

Each of composite sintered materials of samples 3-1 and 3-2 was produced in accordance with the following procedure.

(Preparation Step)

[Sample 3-1]

6 g of hexagonal boron nitride powder (median diameter d90: 5 μm) was prepared. The hexagonal boron nitride powder was introduced into a capsule composed of molybdenum and the capsule was placed in an ultrahigh-pressure high-temperature generator.

[Sample 3-2]

6 g of cubic boron nitride powder (median diameter d90: 5 μm) including more than 10 ppm of an alkali metal and an alkaline earth metal in total was prepared. The cubic boron nitride powder was held in an argon atmosphere at a temperature of 1900° C. for 1 hour to reversely convert the cubic boron nitride into hexagonal boron nitride, thereby obtaining hexagonal boron nitride powder. The hexagonal boron nitride powder was introduced into a capsule composed of molybdenum and was placed in an ultrahigh-pressure high-temperature generator.

(Heat/Pressure Application Step)

The ultrahigh-pressure high-temperature generator was used to increase the pressure of the hexagonal boron nitride powder from the temperature and pressure described in the columns "Temperature" and "Pressure" of "Start Point" in Table 3 while maintaining the temperature, to attain the pressure described in the column "Reached Pressure" of "First Stage".

Then, while maintaining the pressure, the temperature was increased to attain the temperature described in the column "Reached Temperature" of "Second Stage" in Table 3.

Then, while maintaining the temperature, the pressure was increased to attain the pressure described in the column "Reached Pressure" of "Third Stage" in Table 3.

Then, while maintaining the pressure, the temperature was increased to attain the temperature described in the column "Reached Temperature" of "Fourth Stage" in Table 3, and holding was performed for a duration of time described in the column "Holding Time". In this way, the composite sintered material was obtained.

<Evaluation>

(Measurements of Composition, Dislocation Density, and Median Diameter d50 of Crystal Grains)

For each of the obtained composite sintered materials, the measurement of the composition, the measurement of the dislocation density of the cubic boron nitride grains, and the measurement of median diameter d50 were performed in the same manner as in Example 1. Results thereof are shown in columns "cBN Volume %", "hBN Volume %", "wBN Volume %", "Vh+Vw/Vc+Vh+Vw", "cBN Dislocation Density", and "Median Diameter d50" in Table 3.

(Measurement of Total Content of Alkali Metal Element and Alkaline Earth Metal Element)

The total content of the alkali metal element and the alkaline earth metal element in the obtained composite sintered material was measured by SIMS. The total content of the alkali metal element and the alkaline earth metal element is shown in the column "Alkali Metal/Alkali Earth Metal Content" in Table 3.

(Wire Drawing Test)

A through hole was formed in the obtained composite sintered material by laser irradiation, thereby producing a die in which a central portion was composed of the composite sintered material and its surroundings were coated with a metal. A minimum value φ of the diameter of the through hole was 0.1 mm.

The die was used to perform a wire drawing test for a wire material (wire diameter φ: 110 μm; material: SUS304). No lubricant was used during the wire drawing. A wire drawing speed was 250 m/min and an area reduction ratio was 17%.

The wire drawing was performed under the above condition. A drawing time until a point of time at which surface roughness Ra of the wire material became 0.020 μm was determined as the tool life. Surface roughness Ra of the wire material was measured using a laser microscope ("VK-X100" (trademark) manufactured by KEYENCE) based on ISO25178. The tool life of each sample is shown as a ratio in the case where the tool life of a die produced using a commercially available single crystal diamond (manufactured by Sumitomo Electric Hardmetal) when wire drawing is performed using the die under the same conditions as described above is assumed as "1". Results thereof are shown in Table 3. A larger numerical value indicates that the surface condition of the wire material is less likely to be deteriorated and the tool life is longer.

material of sample 3-1, and conversion from cubic boron nitride to hexagonal boron nitride by the alkali metal element and the alkaline earth metal element is less likely to occur even in wire drawing by the die under a condition that a friction portion is likely to have a high temperature, with the result that damage of the tool can be excellently suppressed from being progressed.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present disclosure is defined by the terms of the claims, rather than the embodiments and examples described above, and is intended to include any modifications within the scope and meaning equivalent to the terms of the claims.

The invention claimed is:

1. A composite sintered material comprising:
   cubic boron nitride grains; and
   hexagonal boron nitride grains or the hexagonal boron nitride grains and wurtzite type boron nitride grains, wherein
   a dislocation density of the cubic boron nitride grains is more than or equal to $1 \times 10^{15}/m^2$ and less than or equal to $1 \times 10^{17}/m^2$,
   a median diameter d50 of equivalent circle diameters of the cubic boron nitride grains is more than or equal to 10 nm and less than or equal to 500 nm, and
   a relationship of the following expression 2 is satisfied:

$$0.03 \leq (Vh+Vw)/(Vc+Vh+Vw) \leq 0.4, \quad \text{Expression 2:}$$

where Vc represents a volume-based content ratio of the cubic boron nitride grains, Vh represents a volume-based

TABLE 3

| | | | Heat/Pressure Application Step | | | | | | | | | |
|---|---|---|---|---|---|---|---|---|---|---|---|---|
| | | | First Stage | | | Second Stage | | | Third Stage | | | Fourth Stage |
| | Start Point | | Reached | | | Reached | | | Reached | | | Reached |
| Sample No. | Temperature °C. | Pressure GPa | Temperature °C. | Reached Pressure GPa | Holding Time Minute | Temperature °C. | Reached Pressure GPa | Holding Time Minute | Temperature °C. | Reached Pressure GPa | Holding Time Minute | Temperature °C. |
| 3-1 | 25 | 0 | 25 | 5 | 0 | 1280 | 5 | 0 | 1280 | 6.6 | 0 | 2300 |
| 3-2 | 25 | 0 | 25 | 5 | 0 | 1280 | 5 | 0 | 1280 | 6.6 | 0 | 2300 |

| | Heat/Pressure application Step Fourth Stage | | wBN Stable Region Entry | Composite Sintered Material | | | | | | |
|---|---|---|---|---|---|---|---|---|---|---|
| Sample. No. | Reached Pressure GPa | Holding Time Minute | Temperature °C. | cBN Volume % | hBN Volume % | wBN Volume % | Vh + Vw/ Vc + Vh + Vw | Median Diameter d50 nm | cBN Dislocation Density ×10$^{15}$/m$^2$ | Alkali Metal/ Alkaline Earth Metal Content ppm | Wire Drawing Test Tool Life |
| 3-1 | 6.6 | 20 | 1280 | 65 | 35 | 0 | 0.35 | 430 | 4.8 | 5 | 4.7 |
| 3-2 | 6.6 | 20 | 1280 | 66 | 34 | 0 | 0.34 | 438 | 4.9 | 20 | 3.3 |

<Analysis>

Samples 3-1 and 3-2 correspond to examples of the present disclosure. It was confirmed that the die of sample 3-1 had a longer tool life than that of sample 3-2. This is presumably due to the following reason: since the content of the alkali metal element and the alkaline earth metal element is less than or equal to 10 ppm in the composite sintered content ratio of the hexagonal boron nitride grains, and Vw represents a volume-based content ratio of the wurtzite type boron nitride grains.

2. The composite sintered material according to claim 1, wherein the dislocation density of the cubic boron nitride grains is more than or equal to $1 \times 10^{15}/m^2$ and less than or equal to $3 \times 10^{16}/m^2$.

3. The composite sintered material according to claim 1, wherein the dislocation density of the cubic boron nitride grains is more than or equal to $1\times10^{15}/m^2$ and less than or equal to $5\times10^{15}/m^2$.

4. The composite sintered material according claim 1, wherein the median diameter d50 of the equivalent circle diameters of the cubic boron nitride grains is more than or equal to 10 nm and less than or equal to 300 nm.

5. The composite sintered material according to claim 1, wherein the median diameter d50 of the equivalent circle diameters of the cubic boron nitride grains is more than or equal to 10 nm and less than or equal to 100 nm.

6. The composite sintered material according to claim 1, wherein a total content of an alkali metal element and an alkaline earth metal element in the composite sintered material is less than or equal to 10 ppm on a mass basis.

7. The composite sintered material according to claim 1, wherein the dislocation density is calculated using a modified Williamson-Hall method and a modified Warren-Averbach method.

8. The composite sintered material according to claim 1, wherein the dislocation density is measured using synchrotron radiation as an X-ray source.

9. A tool comprising the composite sintered material recited in claim 1.

10. The composite sintered material according to claim 1, wherein the composite sintered material contains the hexagonal boron nitride grains and the wurtzite type boron nitride grains.

\* \* \* \* \*